US 8,500,564 B2

(12) United States Patent
Shibahiraki

(10) Patent No.: US 8,500,564 B2
(45) Date of Patent: Aug. 6, 2013

(54) SHAFT-AND-YOKE COUPLING STRUCTURE AND VEHICLE STEERING SYSTEM

(75) Inventor: Yutaka Shibahiraki, Kashihara (JP)

(73) Assignees: JTEKT Corporation, Osaka (JP); Koyo Machine Industries Co., Ltd., Yao (JP)

(*) Notice: Subject to any disclaimer, the term of this patent is extended or adjusted under 35 U.S.C. 154(b) by 0 days.

(21) Appl. No.: 13/311,056

(22) Filed: Dec. 5, 2011

(65) Prior Publication Data

US 2012/0142439 A1  Jun. 7, 2012

(30) Foreign Application Priority Data

Dec. 7, 2010 (JP) ................................. 2010-272783

(51) Int. Cl.
*F16D 3/10* (2006.01)

(52) U.S. Cl.
USPC .................. 464/134; 403/359.1; 464/160

(58) Field of Classification Search
USPC ............... 464/134, 160, 180; 403/11, 266, 403/267, 270, 271, 359.1, 359.5; 74/492; 180/440, 444
See application file for complete search history.

(56) References Cited

U.S. PATENT DOCUMENTS

| 1,433,860 | A | * | 10/1922 | Spencer ..................... 403/267 |
| 5,407,386 | A | * | 4/1995 | Kish et al. ................ 464/160 X |
| 2003/0224863 | A1 | | 12/2003 | Simboli |

FOREIGN PATENT DOCUMENTS

| JP | U-05-046649 | 6/1993 |
| JP | A-2006-077963 | 3/2006 |
| WO | WO 2010/015007 A1 | 2/2010 |

OTHER PUBLICATIONS

European Search Report issued in Application No. 11192095.5; Dated Mar. 14, 2012.

* cited by examiner

*Primary Examiner* — Gregory Binda
(74) *Attorney, Agent, or Firm* — Oliff & Berridge, PLC

(57) ABSTRACT

Provided is a shaft-and-yoke coupling structure for coupling a steering transmission shaft and a yoke of a universal joint. An end portion of the steering transmission shaft joined to the yoke has a stepped portion and an insertion convex portion protruding from the stepped portion in the axial direction of the steering transmission shaft. The yoke has an annular receiving portion facing and fixed to the stepped portion via a welded portion and an insertion recess portion surrounded by the receiving portion in which the insertion convex portion is inserted. The insertion convex portion and the insertion recess portion are arranged to be engaged with each other with a predetermined amount of play in the direction of rotation when the welded portion is broken.

5 Claims, 4 Drawing Sheets

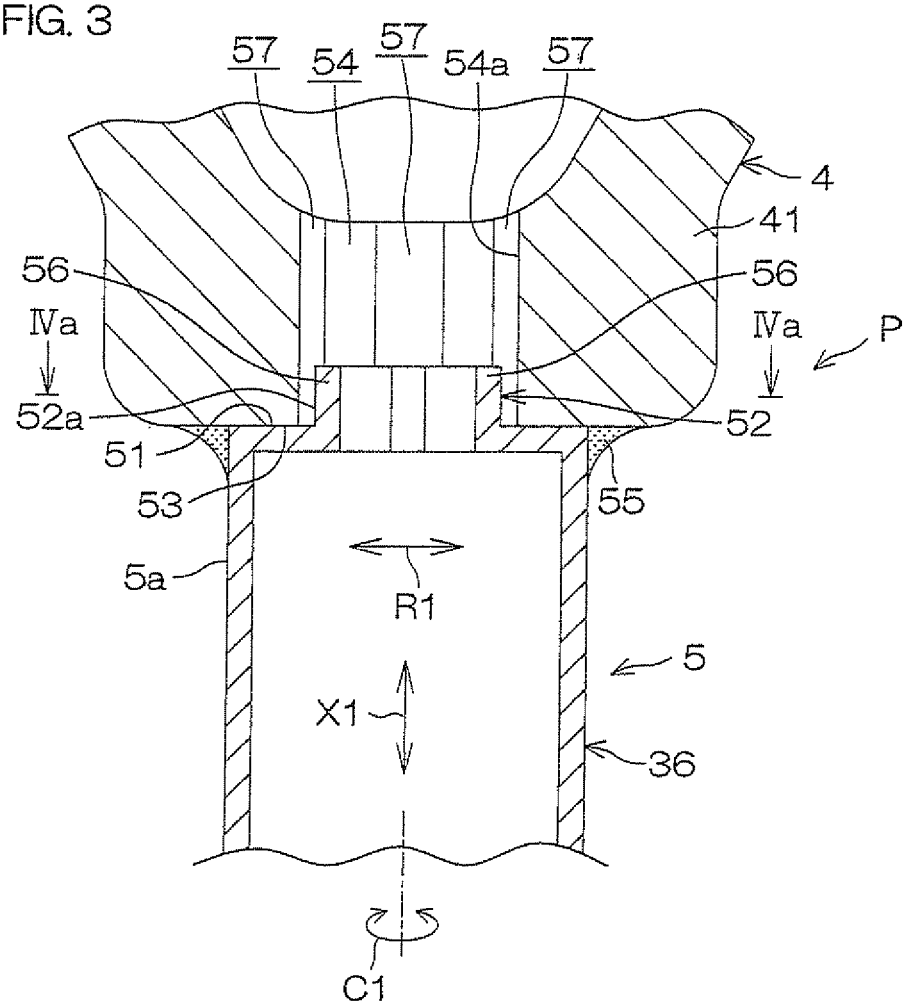

ically, the present invention relates to a shaft-and-yoke coupling structure and a vehicle steering system including the same.

SHAFT-AND-YOKE COUPLING STRUCTURE AND VEHICLE STEERING SYSTEM

BACKGROUND OF THE INVENTION

1. Field of the Invention

The present invention relates to a shaft-and-yoke coupling structure and a vehicle steering system including the same.

2. Description of Related Arts

Generally, in motor vehicles, a steering shaft joined to a steering wheel (steering member) and a steering gear shaft provided as, for example, a pinion shaft are joined to each other via a so-called intermediate shaft being a steering transmission shaft.

Such an intermediate shaft commonly adopts a telescopic shaft in which an inner shaft and a cylindrical outer shaft are joined to each other in an axially and relatively slidable manner. End portions of the inner and outer shafts of the intermediate shaft are joined, respectively, to the corresponding steering shaft and pinion shaft via a universal joint.

Yokes of such universal joints have conventionally been fixed integrally by welding, respectively, to inner and outer shafts of an intermediate shaft (refer to, for example, paragraph [0011] in Japanese Published Unexamined Utility Model Application No. Hei 5-46649). In some cases, the yokes and the corresponding shafts are fitted in a serrated manner so as to be steerable even in the case of breakage of the welded portions. In addition to the fixation by welding, the shafts are swaged to the corresponding yokes in some cases.

Thus adding a serrated fitting and/or swaging allows a torque to be transmitted between the yokes of the universal joints and the intermediate shaft, even in the case of breakage of the welded portions, and thereby a fail-safe function to be achieved.

However, since the torque transmission between the yokes of the universal joints and the intermediate shaft is maintained sufficiently even in the case of breakage of the welded portions, the driver cannot recognize the occurrence of an abnormality. This may cause the driver to continue driving for a long period of time with no repair.

It is therefore an object of the present invention to provide a shaft-and-yoke coupling structure and a vehicle steering system including the same that can perform a fail-safe function in the case of breakage of a welded portion as well as allowing the occurrence of an abnormality to be recognized by the driver.

SUMMARY OF THE INVENTION

In order to achieve the foregoing object, an aspect of the present invention provides a shaft-and-yoke coupling structure including: a steering transmission shaft having an end portion, and a yoke of an universal joint joined to the end portion of the steering transmission shaft, in which the end portion of the steering transmission shaft has a stepped portion and an insertion convex portion protruding from the stepped portion in the axial direction of the steering transmission shaft, the yoke has an annular receiving portion facing and fixed to the stepped portion via a welded portion and an insertion recess portion surrounded by the receiving portion in which the insertion convex portion is inserted, and in which the insertion convex portion and the insertion recess portion are arranged to be engaged with each other with a predetermined amount of play in the direction of rotation when the welded portion is broken.

According to the aspect of the present invention, even in the case of breakage of the welded portion, the insertion convex portion and the insertion recess portion are engaged with each other with a predetermined amount of play in the direction of rotation. The driver can therefore steer the vehicle with a rattling feeling on the steering and can drive to, for example, a repair garage. The rattling feeling on the steering can be provided to the driver, allowing the occurrence of an abnormality to be reliably recognized by the driver.

BRIEF DESCRIPTION OF THE DRAWINGS

FIG. 3 is an enlarged view of an essential portion of the coupling structure shown in FIG. 2.

FIG. 4A is a sectional view taken along the line IVa-IVa in FIG. 3, showing the coupling structure in a normal state, while

DETAILED DESCRIPTION OF THE PREFERRED EMBODIMENT

Preferred embodiments of the present invention will be described with reference to the accompanying drawings.

Figure 1:
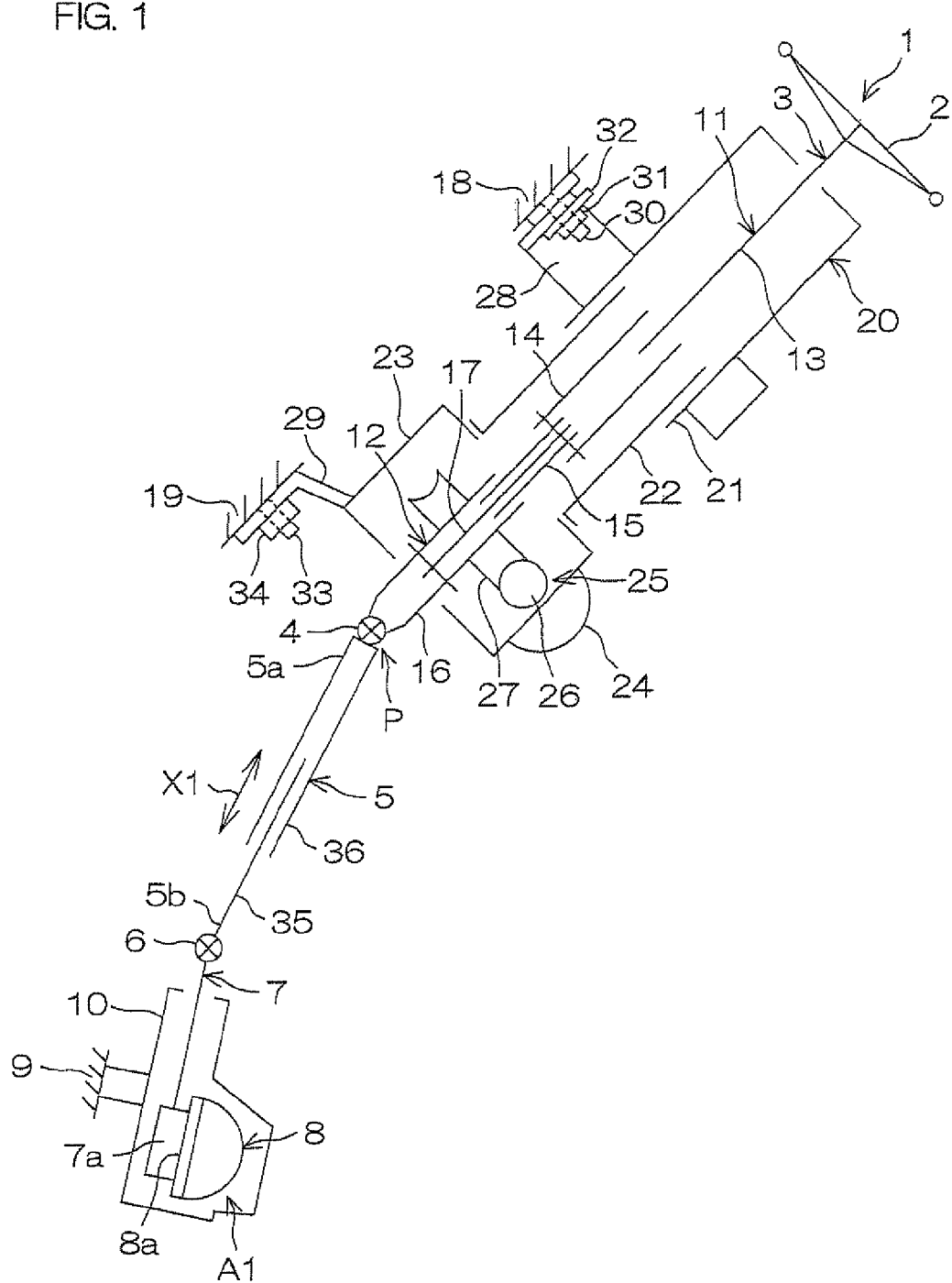
FIG. 1 is a schematic view showing a general configuration of a vehicle steering system to which a shaft-and-yoke coupling structure according to an embodiment of the present invention is applied. A steering transmission shaft and a yoke are coupled through the coupling structure.

FIG. 1 shows a general configuration of a vehicle steering system 1 to which a shaft-and-yoke coupling structure P according to an embodiment of the present invention is applied. Referring to FIG. 1, the vehicle steering system 1 includes a steering shaft 3 joined to a steering member 2 such as a steering wheel, a steering intermediate shaft (hereinafter referred to simply as intermediate shaft) 5 being the steering transmission shaft joined to the steering shaft 3 via a first universal joint 4, a pinion shaft 7 joined to the intermediate shaft 5 via a second universal joint 6, and a rack shaft 8 being a steered shaft having a rack 8a to be meshed with a pinion 7a provided in the vicinity of an end portion of the pinion shaft 7.

A rack-and-pinion mechanism including the pinion shaft 7 and the rack shaft 8 constitutes a steered mechanism A1. The rack shaft 8 is supported by a housing 10 fixed to a vehicle body-side member 9 in an axially movable manner along a right-left direction of the vehicle (i.e. in the direction perpendicular to the plane of the paper). The end portions of the rack shaft 8, although not shown, are joined, respectively, to steered wheels via a tie rod and a knuckle arm.

The steering shaft 3 includes a first steering shaft 11 and a second steering shaft 12 joined coaxially to each other. The first steering shaft 11 has an upper shaft 13 and a lower shaft 19 fitted, using spline coupling, to each other in an associated-rotatable manner as well as in an axially and relatively slidable manner. One of the upper shaft 13 and the lower shaft 14 constitutes an inner shaft, while the other constitutes a cylindrical outer shaft (hollow shaft).

The second steering shaft 12 has an input shaft 15 joined to the lower shaft 14 in an associated-rotatable manner, an output shaft 16 joined, via the first universal joint 4, to a first end portion 5a of the intermediate shaft 5 in a torque transmittable manner, and a torsion bar 17 joining the input shaft 15 and the output shaft 16 in a relatively rotatable manner. On the other hand, a second end portion 5b of the intermediate shaft 5 is joined, via the second universal joint 6, to the pinion shaft 7 in a torque transmittable manner.

The steering shaft 3 is supported rotatably, via a bearing not shown, by a steering column 20 fixed to vehicle body-side members 18 and 19.

The steering column 20 includes a cylindrical upper jacket 21 and a cylindrical lower jacket 22 fitted to each other in an axially and relatively movable manner, and a housing 23 joined to an axial lower end of the lower jacket 22. In the housing 23 is housed a reduction gear mechanism 25 for reducing and transmitting the power of a steering assist electric motor 24 to the output shaft 16.

The reduction gear mechanism 25 has a drive gear 26 joined to the rotary shaft (not shown) of the electric motor 24 in an associated-rotatable manner and a driven gear 27 meshed with the drive gear 26 to rotate in a manner associated with the output shaft 16. The drive gear 26 is constituted by, for example, a worm shaft, and the driven gear 27 is constituted by, for example, a worm wheel.

The steering column 20 is fixed to the vehicle body-side members 18 and 19, respectively, via an upper bracket 28 on the rear side of the vehicle and a lower bracket 29 on the front side of the vehicle. The upper bracket 28 is also fixable to the upper jacket 21 of the steering column 20 via a column bracket to be described later. The upper bracket 28 is fixed to the vehicle body-side member 18 using a fixing bolt (stud bolt) 30 protruding downward from the vehicle body-side member 18, a nut 31 into which the fixing bolt 30 is screwed, and a capsule 32 detachably held on the upper bracket 28.

The lower bracket 29 is fixed to the housing 23 of the steering column 20. The lower bracket 29 is also fixed to the vehicle body-side member 19 using a fixing bolt (stud bolt) 33 protruding from the vehicle body-side member 19 and a nut 34 into which the fixing bolt 33 is screwed.

The intermediate shaft 5 includes a lower shaft 35 constituted by, for example, an inner shaft and a cylindrical upper shaft 36 constituted by, for example, an outer shaft and fitted on the lower shaft 35 in an axially and relatively slidable manner as well as in an associated-rotatable manner.

The present embodiment will be described based on an example in which the coupling structure P between a steering transmission shaft and a yoke of a universal joint is applied to a coupling structure between the first end portion 5a of the intermediate shaft 5 and a first yoke 41 of the first universal joint 4, but not limited thereto. The coupling structure P may be applied to a coupling structure between the second end portion 5b of the intermediate shaft 5 and a yoke of the second universal joint 6.

Figure 2:
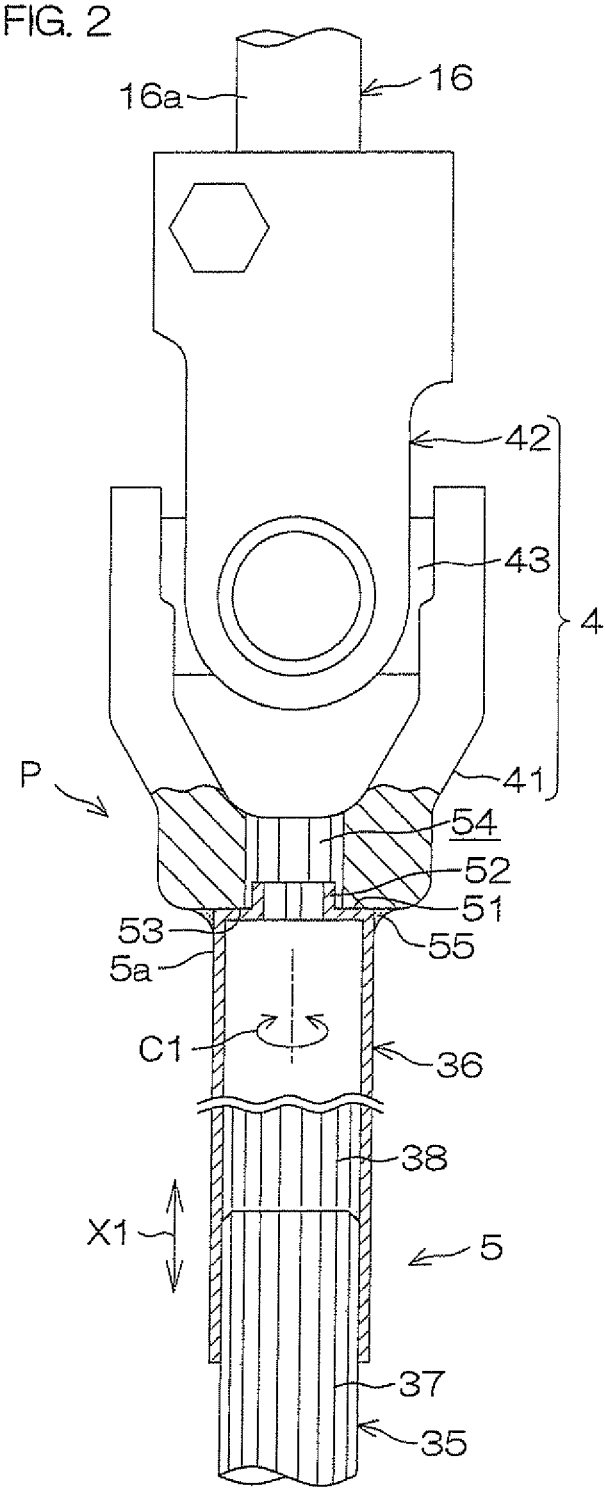
FIG. 2 is a schematic side view of the coupling structure between a steering intermediate shaft being the steering transmission shaft and the yoke of the universal joint.

As shown in FIG. 2, the first universal joint 4 includes the first yoke 41 to which an end portion of the upper shaft 36 being the first end portion 5a of the intermediate shaft 5 is joined, a second yoke 42 to which an end portion 16a of the output shaft 16 of the second steering shaft 12 is joined, and a joint cross 43 joining the first yoke 41 and the second yoke 42 to each other.

Female serrations 38 formed on an inner periphery of the cylindrical upper shaft 36 are fitted on male serrations 37 formed on an outer periphery of the lower shaft 35 of the intermediate shaft 5.

The first end portion 5a of the intermediate shaft 5 has a stepped portion 51 and an insertion convex portion 52 protruding from the stepped portion 51 in the axial direction X1. On the other hand, the first yoke 41 of the first universal joint 4 has an annular receiving portion 53 facing and fixed to the stepped portion 51 via a welded portion 55 and an insertion recess portion 54 surrounded by the receiving portion 53 in which the insertion convex portion 52 is inserted.

The welded portion 55 between the stepped portion 51 and the receiving portion 53 may be arranged on an entire periphery of the stepped portion 51 or at multiple portions in the circumferential direction C1. The present embodiment is characterized in that the insertion convex portion 52 and the insertion recess portion 54 are engageable with each other with a predetermined amount of play in the direction of rotation in the case of breakage of the welded portion 55. This can lead to a fail-safe function for steerability and, at the same time, provide a rattling feeling on the steering allowing the occurrence of an abnormality to be reliably recognized by the driver.

Figure 4A:
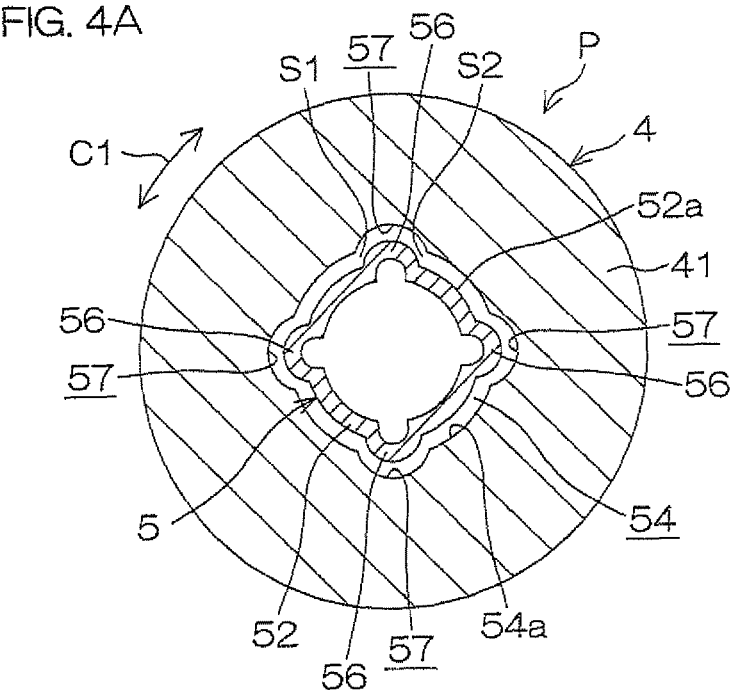

Specifically, as shown in FIG. 3, an enlarged view of FIG. 2, and in FIG. 4A, a sectional view taken along the line IVa-IVa in FIG. 3, an outer periphery 52a of the insertion convex portion 52 has a plurality of joint convex portions 56 protruding outward in the radial direction R1. The plurality of joint convex portions 56 are arranged at regular intervals in the circumferential direction C1. On the other hand, an inner periphery 54a of the insertion recess portion 54 has a plurality of joint recess portions 57 recessed outward in the radial direction R1. At least the leading end portions of the joint convex portions 56 are housed, respectively, in the corresponding joint recess portions 57 with a predetermined amount of clearance S1 and S2 in the direction of rotation (corresponding to the circumferential direction C1).

Figure 4B:
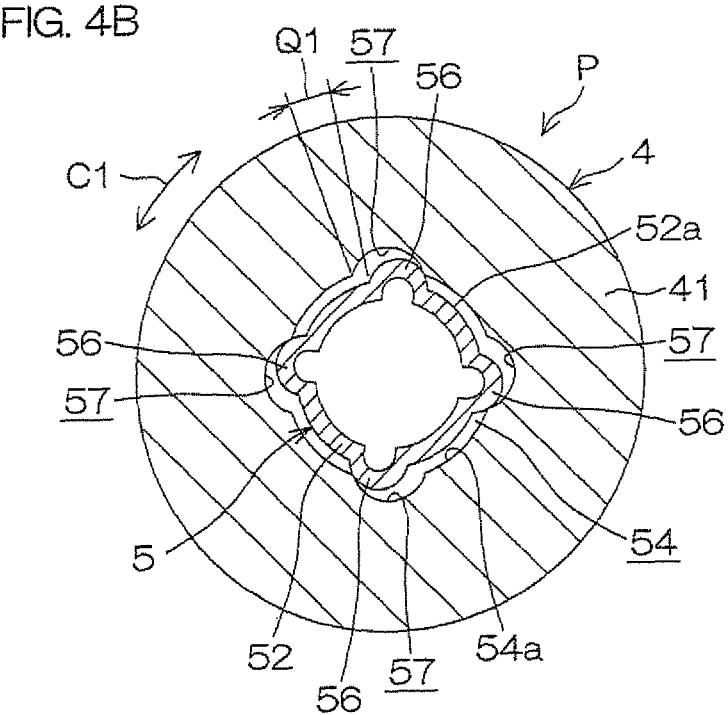
FIG. 4B shows the coupling structure on occurrence of an abnormality.

That is, as shown in FIG. 4B, the joint convex portions 56 are engageable, respectively, with the corresponding joint recess portions 57 with a play Q1 (corresponding to a predetermined angle set within a range from 10 to 30 degrees, for example) in the direction of rotation (circumferential direction C1).

According to the present embodiment, even if the welded portion 55 between the stepped portion 51 in the first end portion 5a of the intermediate shaft 5 and the receiving portion 53 in the first yoke 41 of the first universal joint 4 may be broken, the insertion convex portion 52 of the intermediate shaft 5 and the insertion recess portion 54 of the first yoke 41 are engaged with each other with a predetermined amount of play Q1 in the direction of rotation (circumferential direction C1). The driver can therefore steer the vehicle with a rattling feeling on the steering and can drive to, for example, a repair garage. The rattling feeling on the steering can be provided to the driver, allowing the occurrence of an abnormality to be reliably recognized by the driver.

Specifically, the joint convex portions 56 on the outer periphery 52a of the insertion convex portion 52 are engaged with the inner periphery 54a of the insertion recess portion 54 with a predetermined amount of play Q1 in the direction of rotation to be steerable and, at the same time, provide a rattling feeling on the steering to the driver to thereby warn of the occurrence of an abnormality and encourage the driver to repair the vehicle.

Further, the steering transmission shaft being the intermediate shaft 5 as in the present embodiment has the advantage that the first end portion 5a of the intermediate shaft 5 is joined to the output shaft 16 of the second steering shaft 12 via the Cardin-type first universal joint 4, while the second end portion 5b of the intermediate shaft 5 is joined to the pinion shaft 7 being a steering gear shaft via the Cardin-type second universal joint 6.

A phase shifting is provided between the universal joints 4 and 6 so as not to allow the driver to feel torque fluctuations during steering. According to the present embodiment, the intermediate shaft 5 may be phase-rotated in the direction of rotation with respect to the first yoke 41 of the first universal joint 4 for phase adjustment immediately before the final step of welding the first yoke 41 and the first end portion 5a of the intermediate shaft 5 (end portion of the cylindrical upper shaft 36). In this case, between the insertion convex portion 52 of the intermediate shaft 5 and the insertion recess portion 54 of the first yoke 41, a predetermined amount of play Q1 (e.g. 10 to 30 degrees) in the direction of rotation (circumferential direction C1) is allowed by the joint convex portions 56 and the joint recess portions 57, providing a high degree of freedom during the phase adjustment.

In addition, since the upper shaft 36 of the intermediate shaft 5 joined to the first yoke 41 is constituted by a cylindrical hollow shaft, the joint convex portions 56 can be formed and manufactured easily through drawing or the like.

The present invention is not limited to the above-described embodiment. For example, in the above-described embodiment, the coupling structure P according to the present invention is applied to coupling between the upper shaft 36 of the intermediate shaft 5 (steering intermediate shaft) and the corresponding yoke of the universal joint 4. Without limiting to this, the coupling structure according to the present invention may be applied to coupling between an end portion of the lower shaft 35 of the intermediate shaft 5 (steering intermediate shaft) being the steering transmission shaft and the corresponding yoke of the universal joint 6.

Alternatively, joint recess portions may be provided on the outer periphery 52a of the insertion convex portion 52, while joint convex portions may be provided on the inner periphery 54a of the insertion recess portion 54, although not shown.

Moreover, in the above-described embodiment, the insertion convex portion 52 that is provided in the end portion of the hollow shaft included in the steering transmission shaft (which may be the upper shaft 36 or lower shaft of the intermediate shaft 5 in the above-described embodiment) is inserted in the insertion recess portion 54 of the corresponding yoke 41. Instead of this, an insertion convex portion that is provided in an end portion of a solid shaft included in the steering transmission shaft (which may be any one of the upper shaft or lower shaft of the intermediate shaft 5) may be inserted in the insertion recess portion of the corresponding yoke (not shown).

Although the four joint convex portions 56 are arranged at regular intervals in the embodiment shown in FIGS. 4A and 4B, two joint convex portions may be arranged at 180-degree intervals or three joint convex portions may be arranged at 120-degree intervals or the number of joint recess portions provided may be the same as that of the joint convex portions. Five or more joint convex portions and the same number of the joint recess portions may be provided. The joint convex portions and the joint recess portions may be formed in any shape without limiting to such a chevron shape as shown in FIGS. 4A and 4B.

The present invention has been described above in detail based on some specific aspects. Various variations, modifications, and equivalents are readily conceivable to those skilled in the art who understand the above description. Therefore, the scope of the present invention should be defined by the claims appended hereto and their equivalents.

The present application corresponds to Japanese Patent Application No. 2010-272783 filed on Dec. 7, 2010 to Japan Patent Office, the disclosure of which is incorporated herein by reference in its entirety.

Reference Signs List

1: Vehicle steering system, 2: Steering member, 3: Steering shaft, 4: First universal joint, 5: Intermediate shaft (steering intermediate shaft or steering transmission shaft), 5a: First end portion, 5b: Second end portion, 6: Second universal joint, 7: Pinion shaft, 11: First steering shaft, 12: Second steering shaft, 16: Output shaft, 35: Lower shaft, 36: Upper shaft, 51: Stepped portion, 52: Insertion convex portion, 52a: Outer periphery, 53: Receiving portion, 54: Insertion recess portion, 54a: Inner periphery, 55: Welded portion, 56: Joint convex portion, 57: Joint recess portion, 41: First yoke, X1: Axial direction, R1: Radial direction, C1: Circumferential direction

What is claimed is:

1. A shaft-and-yoke coupling structure comprising:
a steering transmission shaft having an end portion, and
a yoke of a universal joint joined to the end portion of the steering transmission shaft, wherein
the end portion of the steering transmission shaft has a stepped portion and an insertion convex portion protruding from the stepped portion in the axial direction of the steering transmission shaft,
the yoke has an annular receiving portion facing and fixed to the stepped portion via a welded portion and an insertion recess portion surrounded by the receiving portion in which the insertion convex portion is inserted, and wherein
the insertion convex portion and the insertion recess portion are arranged to be engaged with each other with a predetermined amount of play in the direction of rotation when the welded portion is broken, and
the predetermined amount of play corresponds to a predetermined angle set within a range from 10 to 30 degrees in the direction of rotation.

2. The shaft-and-yoke coupling structure according to claim 1, wherein one of an outer periphery of the insertion convex portion and an inner periphery of the insertion recess portion has a plurality of joint convex portions protruding in the radial direction of the steering transmission shaft, while the other of the outer periphery of the insertion convex portion and the inner periphery of the insertion recess portion has a plurality of joint recess portions recessed in the radial direction, and wherein the joint convex portions are arranged to be engageable, respectively, with the corresponding joint recess portions with the predetermined amount of play in the direction of rotation.

3. The shaft-and-yoke coupling structure according to claim 2, wherein the steering transmission shaft includes a steering intermediate shaft.

4. The shaft-and-yoke coupling structure according to claim 1, wherein the steering transmission shaft includes a hollow shaft, and wherein the stepped portion and the insertion convex portion are provided in an end portion of the hollow shaft.

5. A vehicle steering system, wherein a steering intermediate shaft being the steering transmission shaft is coupled, via the shaft-and-yoke coupling structure according to claim 1, to the corresponding yoke of the universal joint.

* * * * *